United States Patent
Iwamoto

(10) Patent No.: US 9,834,086 B2
(45) Date of Patent: Dec. 5, 2017

(54) RADIATOR SUPPORT STRUCTURE

(71) Applicant: TOYOTA JIDOSHA KABUSHIKI KAISHA, Toyota-shi, Aichi-ken (JP)

(72) Inventor: Yasunori Iwamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

(21) Appl. No.: 14/993,392

(22) Filed: Jan. 12, 2016

(65) Prior Publication Data

US 2016/0236562 A1    Aug. 18, 2016

(30) Foreign Application Priority Data

Feb. 18, 2015  (JP) ................................. 2015-029739

(51) Int. Cl.
 *B60K 11/04*   (2006.01)
 *B62D 25/08*   (2006.01)
 *B62D 21/15*   (2006.01)

(52) U.S. Cl.
 CPC ............ *B60K 11/04* (2013.01); *B62D 21/152* (2013.01); *B62D 25/084* (2013.01); *B60Y 2306/01* (2013.01)

(58) Field of Classification Search
 None
 See application file for complete search history.

(56) References Cited

U.S. PATENT DOCUMENTS

| | | | | |
|---|---|---|---|---|
| 5,573,299 A | * | 11/1996 | Masuda | B60K 11/04 180/68.4 |
| 6,659,518 B2 | * | 12/2003 | Ponsonnaille | B60D 1/488 293/102 |
| 7,766,112 B2 | | 8/2010 | Kapadia et al. | |
| 7,896,428 B2 | * | 3/2011 | Tamakoshi | B62D 21/152 296/187.03 |
| 7,992,926 B2 | | 8/2011 | Yamakoshi | |
| 9,004,576 B2 | * | 4/2015 | Sakakibara | B62D 25/085 293/133 |

(Continued)

FOREIGN PATENT DOCUMENTS

DE  102011009702 A1  11/2011
EP    2 374 665 A1  10/2011

(Continued)

OTHER PUBLICATIONS

Jun. 29, 2016 Search Report issued in European Patent Application No. 16152854.2.

*Primary Examiner* — John D Walters
*Assistant Examiner* — Hilary L Johns
(74) *Attorney, Agent, or Firm* — Oliff PLC

(57) ABSTRACT

A radiator support structure includes: a first attachment member that is fixed to a vehicle body, and that supports a radiator body; and a second attachment member that (i) is separate from and unattached to the first attachment member, (ii) is attached to a front side member of the vehicle body through a shock absorbing member that is fixed to a vehicle front-rear direction front end of the front side member, and (iii) supports the radiator body. At least one of the first attachment member and the second attachment member is configured to detach from the radiator body when a collision force in the vehicle front-rear direction is applied to the second attachment member.

16 Claims, 11 Drawing Sheets

(56) References Cited

U.S. PATENT DOCUMENTS

| | | | |
|---|---|---|---|
| 9,016,416 B2* | 4/2015 | Yamaguchi | B62D 21/152 180/68.4 |
| 9,016,766 B2* | 4/2015 | Silva | B60R 19/12 296/187.09 |
| 9,132,794 B2* | 9/2015 | Nagaya | B60R 19/34 |
| 9,327,675 B2* | 5/2016 | Kito | B60R 21/34 |
| 9,452,723 B2* | 9/2016 | Hahn | B60R 19/34 |
| 2009/0140546 A1* | 6/2009 | Okabe | B60R 19/18 296/187.09 |
| 2009/0315311 A1* | 12/2009 | Tamakoshi | B62D 21/155 280/784 |
| 2010/0163324 A1 | 7/2010 | Jyoutaki et al. | |
| 2012/0247849 A1 | 10/2012 | Ogawa | |

FOREIGN PATENT DOCUMENTS

| | | |
|---|---|---|
| JP | 2007331452 A | 12/2007 |
| JP | 2010-000972 A | 1/2010 |
| JP | 2010-515621 A | 5/2010 |
| JP | 2011148458 A | 8/2011 |
| JP | 2011-218911 A | 11/2011 |
| JP | 2012086695 A | 5/2012 |
| JP | 2012-224327 A | 11/2012 |

* cited by examiner

RADIATOR SUPPORT STRUCTURE

CROSS-REFERENCE TO RELATED APPLICATION

This application is based upon and claims the benefit of priority of the prior Japanese Patent Application No. 2015-029739, filed on Feb. 18, 2015, the entire contents of which are incorporated herein by reference.

FIELD

The embodiments discussed herein are related to a radiator support structure.

BACKGROUND

Japanese Patent Application Laid-Open (JP-A) No. 2011-148458 describes a structure in which a radiator support lower and a radiator support upper are configured as separate bodies, and the radiator support lower and the radiator support upper are respectively attached to vehicle front-rear direction front end portions of front side members. In this structure, a radiator body is supported by the radiator support lower and the radiator support upper. Other configurations to support a radiator body are described in JP-A No. 2012-086695 and JP-A No. 2007-331452.

In the structure described in JP-A No. 2011-148458, the radiator support lower and the radiator support upper are respectively attached to the front end portions of the front side members. When an attachment portion of the radiator support lower and an attachment portion of the radiator support upper are displaced relative to each other, the radiator body deforms. There is room for improvement in suppressing deformation of the radiator body in a collision.

In consideration of the above circumstances, an object of the present disclosure is to obtain a radiator support structure capable of suppressing deformation of a radiator body in a collision.

SUMMARY

A radiator support structure of a first aspect includes: a first attachment member that is fixed to a vehicle body, and that supports a radiator body; and a second attachment member that (i) has a non-coupled structure with respect to the first attachment member (that is, the second attachment member is separate from and unattached to the first attachment member), (ii) is (directly or indirectly) attached to a front side member of the vehicle body through a shock absorbing member that is fixed to a vehicle front-rear direction front end of the front side member, and (iii) supports the radiator body, wherein at least one of the first attachment member and the second attachment member is configured to detach from the radiator body when a collision force in the vehicle front-rear direction is applied to the second attachment member.

In the radiator support structure of the first aspect, the radiator body is supported by the first attachment member that is fixed to the vehicle body. The second attachment member has a non-coupled structure with respect to the first attachment member, and the second attachment member is (directly or indirectly) attached to the shock absorbing member, which in turn is fixed to the vehicle front-rear direction front end of the front side member. The radiator body also is supported by the second attachment member. Since the second attachment member has a non-coupled structure with respect to the first attachment member, the second attachment member and the first attachment member do not deform as a single unit. When the shock absorbing member is crushed in a collision, the second attachment member that is (directly or indirectly) attached to the shock absorbing member accordingly moves toward the vehicle rear together with the shock absorbing member. The second attachment member moves toward the vehicle rear together with the shock absorbing member, thereby enabling the radiator body supported by the second attachment member to move toward the vehicle rear. When the radiator body moves toward the vehicle rear, the radiator body detaches from either the first attachment member or the second attachment member, thereby suppressing deformation of the radiator body. Accordingly, deformation of the radiator body in a collision can be better suppressed than in configurations in which a radiator body is attached to the vehicle body (for example a front side member) through an attachment member.

A radiator support structure of a second aspect is the radiator support structure of the first aspect, wherein the second attachment member is disposed at a vehicle upper side of the first attachment member, and the second attachment member is configured to support an upper portion of the radiator body, and the first attachment member is configured to support a lower portion of the radiator body.

In the radiator support structure of the second aspect, the second attachment member is disposed at the vehicle upper side of the first attachment member. The upper portion of the radiator body is supported by the second attachment member, and the lower portion of the radiator body is supported by the first attachment member. Accordingly, in a collision the second attachment member moves toward the vehicle rear together with the shock absorbing member, and displacement of the upper portion of the radiator body toward the vehicle rear is permitted, thereby enabling deformation of the radiator body in a collision to be effectively suppressed, and contributing to an improvement in pedestrian protection performance.

A radiator support structure of a third aspect is the radiator support structure of the first aspect, wherein the second attachment member is disposed at a vehicle lower side of the first attachment member, and the second attachment member is configured to support a lower portion of the radiator body, and the first attachment member is configured to support an upper portion of the radiator body.

In the radiator support structure of the third aspect, the second attachment member is disposed at the vehicle lower side of the first attachment member. The lower portion of the radiator body is supported by the second attachment member, and the upper portion of the radiator body is supported by the first attachment member. Accordingly, in a collision the second attachment member moves toward the vehicle rear together with the shock absorbing member, and displacement of the lower portion of the radiator body toward the vehicle rear is permitted, thereby enabling deformation of the radiator body to be effectively suppressed in a collision.

A radiator support structure of a fourth aspect is the radiator support structure of the first aspect, wherein the first attachment member is configured to detachably support the radiator body with respect to the vehicle body.

In the radiator support structure of the fourth aspect, the first attachment member is configured to detachably support the radiator body with respect to the vehicle body. When the second attachment member moves toward the vehicle rear together with the shock absorbing member in a collision, the first attachment member lets the radiator body detach from the vehicle body. This thereby enables deformation of the radiator body in a collision to be effectively suppressed.

A radiator support structure of a fifth aspect is the radiator support structure of the fourth aspect, further comprising a support member extending along a vehicle width direction, the support member being disposed in a vicinity of a vehicle rear side of the radiator body.

In the radiator support structure of the fifth aspect, the support member extending along the vehicle width direction is disposed in the vicinity of the vehicle rear side of the radiator body. Accordingly, when the second attachment member moves toward the vehicle rear together with the shock absorbing member in a collision, the radiator body supported by the second attachment member contacts the support member. This thereby enables the first attachment member and the radiator body to detach earlier.

A radiator support structure of a sixth aspect is the radiator support structure of the first aspect, wherein the second attachment member is attached to a bumper reinforcement that is fixed to a vehicle front-rear direction front end of the shock absorbing member, and that extends in a vehicle width direction. Namely, the second attachment member is indirectly attached to the shock absorbing member through the bumper reinforcement.

In the radiator support structure of the sixth aspect, the second attachment member is attached to the bumper reinforcement that is fixed to the vehicle front-rear direction front end of the shock absorbing member and that extends in the vehicle width direction. Accordingly, when the shock absorbing member is crushed in a collision, the second attachment member attached to the bumper reinforcement moves toward the vehicle rear. This thereby enables deformation of the radiator body in a collision to be suppressed.

The radiator support structure according to the preferred embodiments enables deformation of the radiator body in a collision to be suppressed.

DESCRIPTION OF EMBODIMENTS

First Exemplary Embodiment

Figure 1:
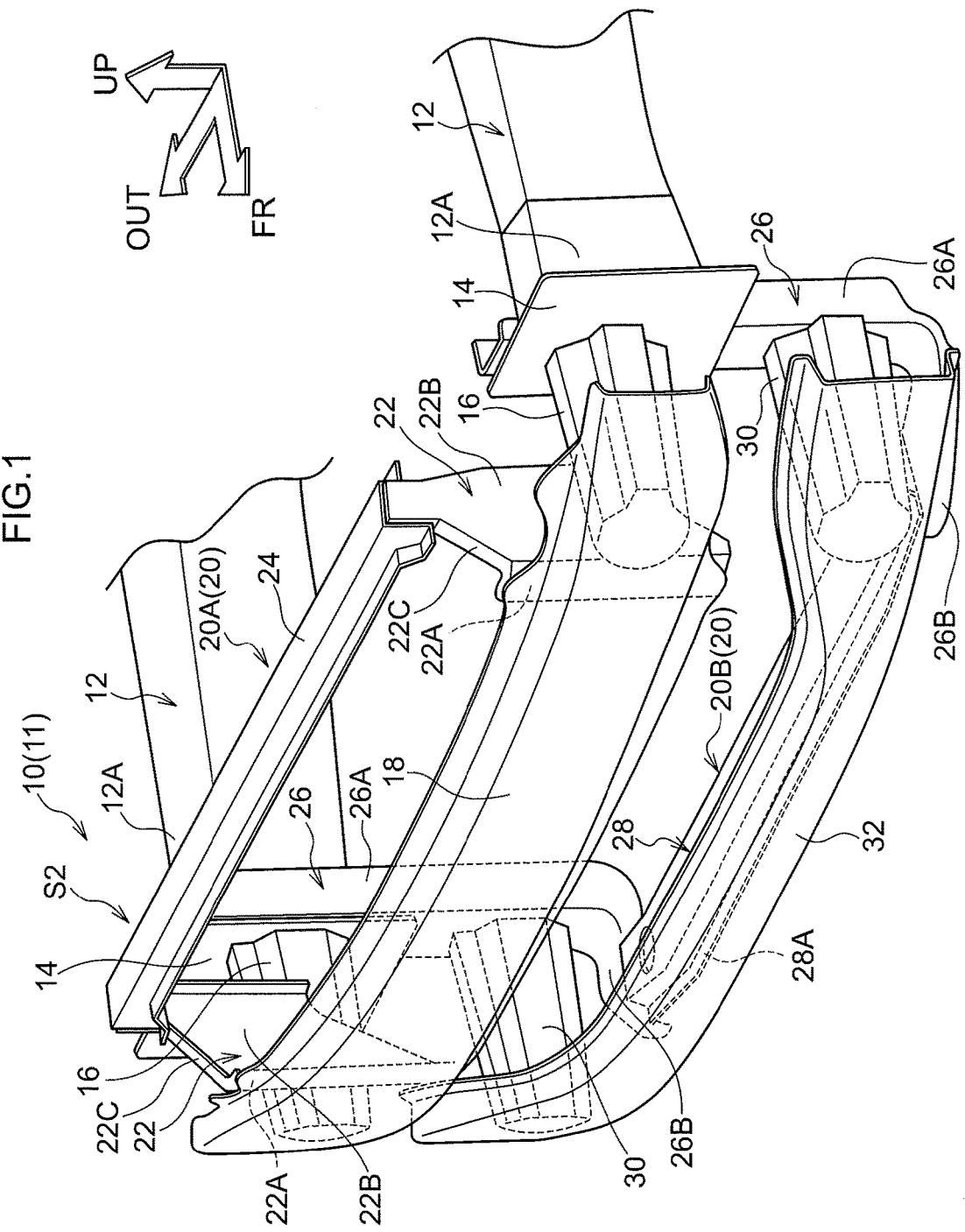
FIG. 1 is a perspective view illustrating a front section of a vehicle equipped with a radiator support structure according to a first exemplary embodiment.

Explanation follows regarding a first exemplary embodiment of a radiator support structure, with reference to FIG. 1 to FIG. 6. In the drawings, the arrow FR indicates the vehicle front side, the arrow UP indicates the vehicle upper side, and the arrow OUT indicates the vehicle width direction outside, as appropriate.

Figure 2:
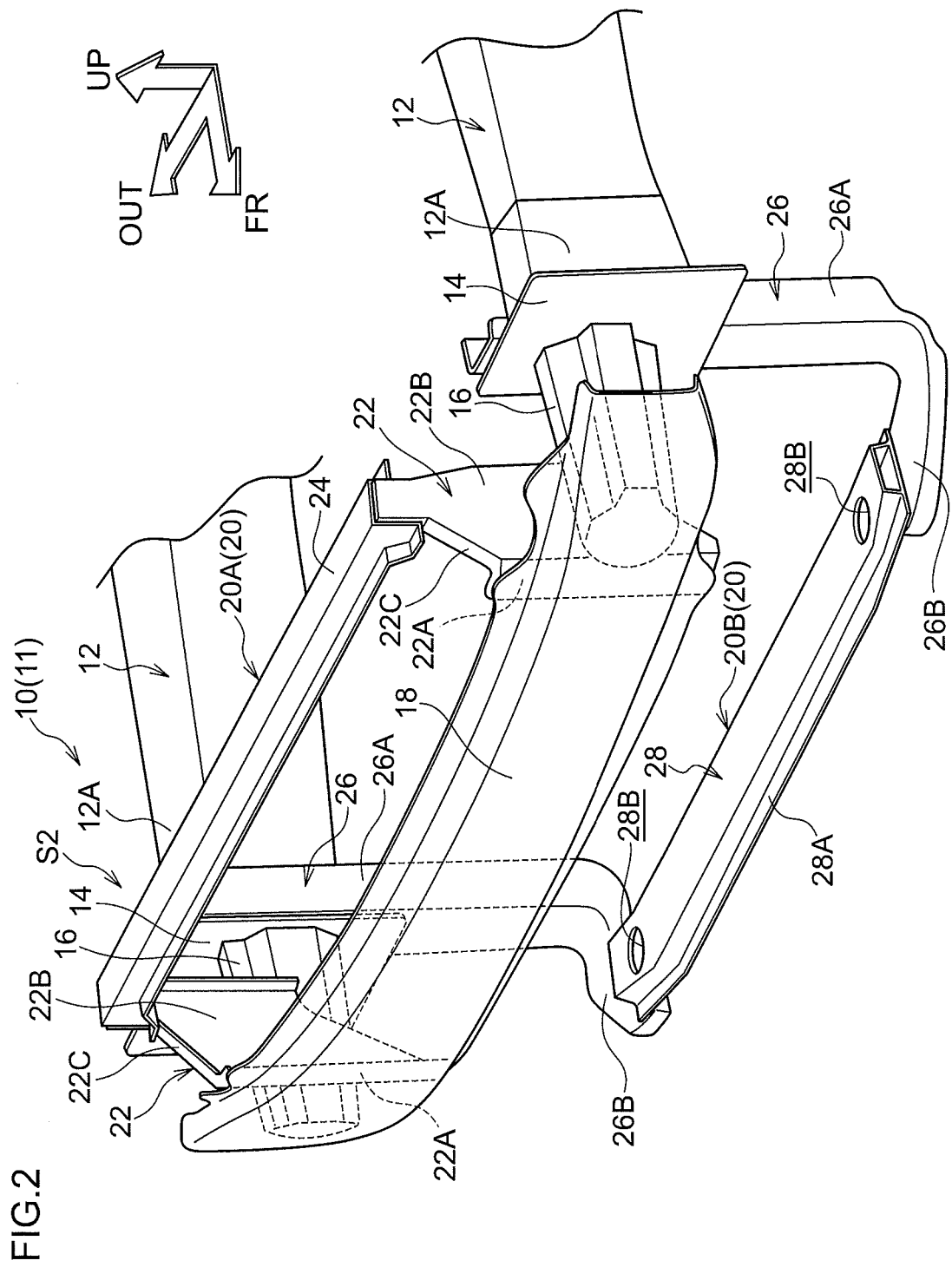
FIG. 2 is a perspective view illustrating an overall configuration of the radiator support structure illustrated in FIG. 1.
Figure 3:
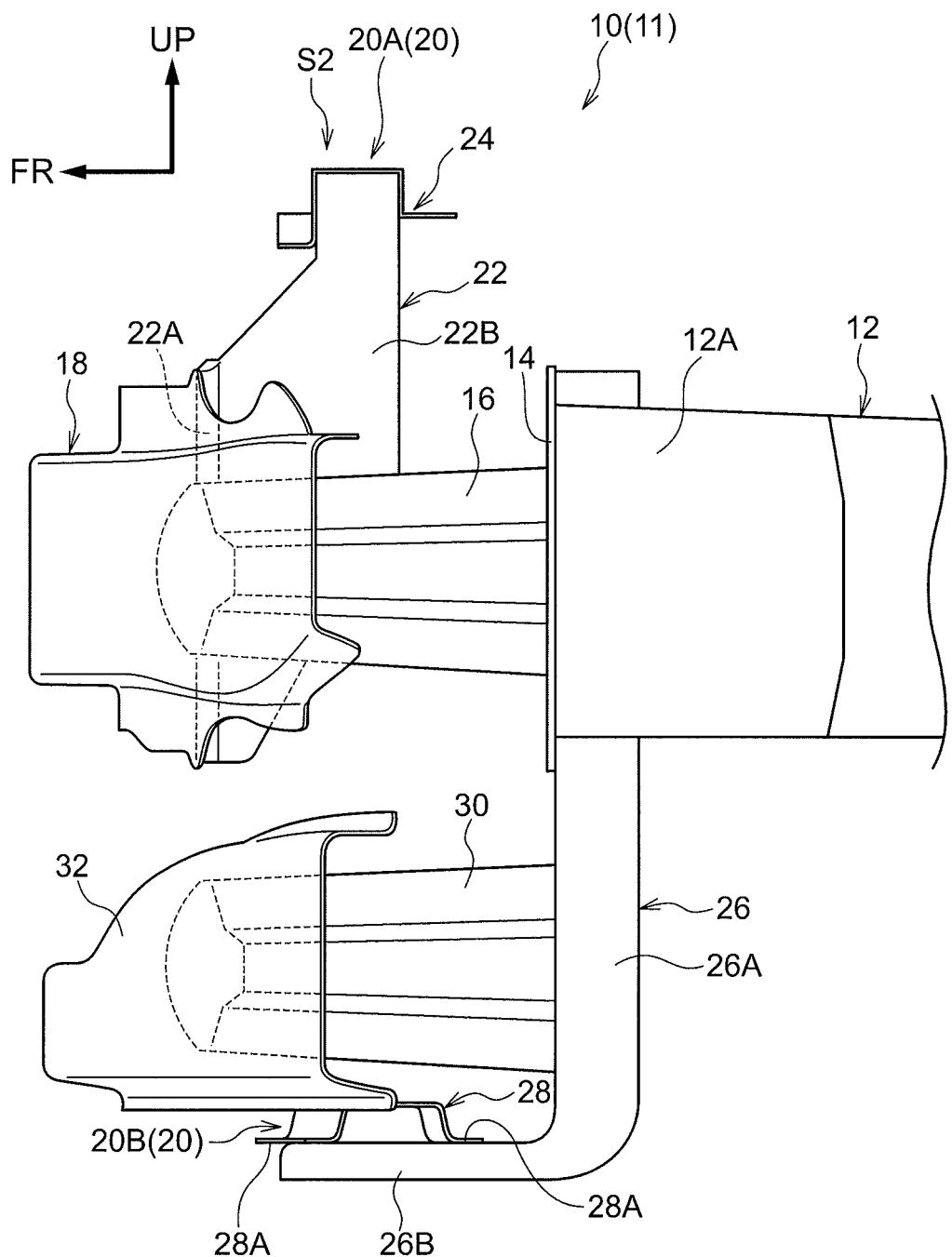
FIG. 3 is a side view illustrating a front section of a vehicle equipped with the radiator support structure illustrated in FIG. 1.
Figure 4:
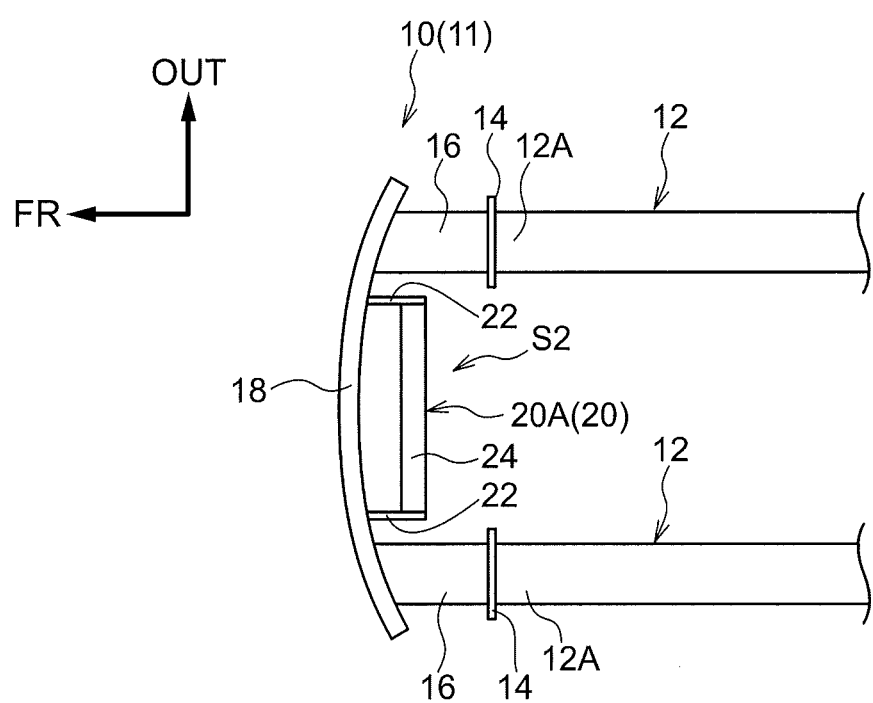
FIG. 4 is a plan view illustrating the radiator support structure illustrated in FIG. 1.

FIG. 1 is a perspective view illustrating a front section of a vehicle equipped with a radiator support structure according to the present exemplary embodiment. FIG. 2 is a perspective view illustrating an overall configuration of the radiator support structure illustrated in FIG. 1. FIG. 3 is a side view illustrating a front section of a vehicle equipped with the radiator support structure illustrated in FIG. 1. FIG. 4 is a schematic plan view illustrating the radiator support structure illustrated in FIG. 1. As illustrated in FIG. 1 to FIG. 4, front side members 12, serving as a vehicle body extending in the vehicle front-rear direction, are installed on both sides of a front section 11 of a vehicle 10, this being a car. The front side members 12 are configured as vehicle framework members with a substantially rectangular shaped cross-section as taken substantially along the vehicle width direction and substantially along the vehicle up-down direction. A crash box 16, serving as a shock absorbing member, is provided through a reinforcement plate 14 on the vehicle front-rear direction front side of a front end portion 12A of each of the front side members 12. The crash box 16 includes a tube shaped portion disposed substantially along the vehicle front-rear direction, and undergoes axial direction compression deformation when input with a collision load, thereby absorbing collision energy. A front bumper reinforcement 18 extending along the vehicle width direction is installed at vehicle front-rear direction front end sides of the respective crash boxes 16.

The front bumper reinforcement 18 is a metal bumper framework member, and spans between front end portions of the pair of left and right crash boxes 16. The front bumper reinforcement 18 has a curved shape, such that a vehicle width direction central portion projects out further to the vehicle front side than both vehicle width direction end portions.

The front section 11 of the vehicle 10 is equipped with a radiator support structure S2 of the present exemplary embodiment. The radiator support structure S2 includes a radiator support 20 that supports a radiator body 40 (see FIG. 5). The radiator support 20 includes an upper portion 20A serving as a second attachment member that is attached to the front bumper reinforcement 18, and a lower portion 20B serving as a first attachment member that is disposed separately to (apart from and independently of) the upper portion 20A and that is attached to the front side members 12. In other words, the upper portion 20A and the lower portion 20B configuring the radiator support 20 are not connected to each other. Namely, the upper portion 20A has a non-coupled structure with respect to the lower portion 20B. In particular, the upper portion 20A and the lower portion 20B are movable relative to each other. More particularly, the lower portion 20B is rigidly fixed to the front side members 12, whereas the upper portion 20A is movably fixed to the front side members 12 via the crash boxes 16.

The upper portion 20A of the radiator support 20 includes a pair of left and right wall bodies 22 that are fixed to both vehicle width direction end portions of the front bumper reinforcement 18, and an upper portion body 24 that is fixed to upper end portions of the wall bodies 22 and extends in the vehicle width direction between the wall bodies 22. The wall bodies 22 each include an attachment portion 22A fixed to a rear face portion of the front bumper reinforcement 18, and an upright wall portion 22B that extends toward the vehicle rear side from the attachment portion 22A and is disposed substantially along the vehicle up-down direction and substantially along the vehicle front-rear direction. The upright wall portion 22B extends from the attachment portion 22A toward the vehicle upper side, and an edge portion of the upright wall portion 22B is provided with a bent portion 22C bending toward the vehicle width direction inside. The pair of left and right wall bodies 22 are formed with left-right symmetry to each other, on both sides in the vehicle width direction.

In the present exemplary embodiment, the attachment portions 22A of the wall bodies 22 configuring the upper portion 20A are fixed to the front bumper reinforcement 18 by fasteners such as nuts and bolts, not illustrated in the drawings. Note that the attachment portions 22A of the wall bodies 22 may be fixed to the front bumper reinforcement 18 by welding.

The upper portion body 24 is formed substantially with a hat shaped cross-section as taken substantially along the vehicle up-down direction and substantially along the vehicle front-rear direction, and is disposed so as to open toward the vehicle lower side. The upright wall portions 22B of the wall bodies 22 and upper end portions of the bent portions 22C substantially form protrusions following the shape of the inside of the upper portion body 24, and are disposed such that the upper portion body 24 covers the bent portions 22C (such that the bent portions 22C are covered). The upper portion body 24 is joined to the bent portions 22C by welding, or by fasteners such as nuts and bolts.

As described above, the upper portion 20A of the radiator support 20 is attached to the front bumper reinforcement 18 that extends along the vehicle width direction at the front end side of the crash boxes 16. In other words, the upper portion 20A of the radiator support 20 is indirectly attached to the crash boxes 16, and is attached to the front side members 12 through the crash boxes 16, which are fixed to the front sides of the front end portions 12A of the front side members 12. Namely, the upper portion 20A of the radiator support 20 is indirectly attached to the crash boxes 16, which are fixed to the front sides of the front end portions 12A of the front side members 12, through the front bumper reinforcement 18.

The shapes of the wall bodies 22 and the shape of the upper portion body 24 are not limited to the shapes in the present exemplary embodiment, and may be modified.

As illustrated in FIG. 2 and FIG. 3, the lower portion 20B of the radiator support 20 includes a pair of left and right brackets 26 attached to the front side members 12 on both vehicle width direction sides, and a lower portion body 28 that is fixed to lower end portions of the brackets 26 and extends in the vehicle width direction between the brackets 26. Each of the brackets 26 includes a wall body 26A extending from the front side member 12 toward the lower side in the vehicle up-down direction, and an extension portion 26B extending from a lower end portion of the wall body 26A toward the vehicle front side and the vehicle width direction inside. The pair of left and right brackets 26 are formed with left-right symmetry to each other, on both sides in the vehicle width direction.

The wall body 26A of each bracket 26 is formed with a substantially U-shaped cross-section as taken substantially along the vehicle width direction and substantially along the vehicle front-rear direction, and is disposed so as open toward the vehicle rear side. An outside face of an upper portion of the wall body 26A is disposed in a face-contact state with a side wall of the front end portion 12A of the front side member 12, and is joined thereto by welding. Joining the upper portion of the wall body 26A to the side wall of the front end portion 12A of the front side member 12 by welding enables improved positional precision of the front end portions 12A of the left and right front side members 12. A front face of the upper portion of the wall body 26A is joined to a rear face of the reinforcement plate 14 by welding or the like. In the present exemplary embodiment, the outside face of the upper portion of the wall body 26A is joined by welding to the side wall on the inside of the front side member 12; however, the configuration for joining the bracket 26 to the front side members 12 may be modified.

The extension portion 26B of the bracket 26 is formed with a substantially U-shaped cross-section as taken substantially along the vehicle width direction and substantially along the vehicle up-down direction, and is disposed so as to open toward the vehicle lower side. The lower portion body 28 is configured with a substantially rectangular shape, and is provided with a pair of flanges 28A at the front and rear in the vehicle front-rear direction (see FIG. 2). Each of the pair of front and rear flanges 28A of the lower portion body 28 is joined to an upper face of the extension portion 26B by welding, or by fasteners such as nuts and bolts.

As illustrated in FIG. 1 and FIG. 3, a lower crash box (also referred to as a second member) 30, disposed substantially along the vehicle front-rear direction, is attached to a front face portion of the wall body 26A of each bracket 26. Lower bumper reinforcement 32, extending substantially along the vehicle width direction, is attached to vehicle front-rear direction front sides of the pair of left and right lower crash boxes 30. Each of the lower crash boxes 30 has a tube shape disposed substantially in the vehicle front-rear direction, and undergoes axial direction compression deformation when input with a collision load, thereby absorbing collision energy.

Figure 5:
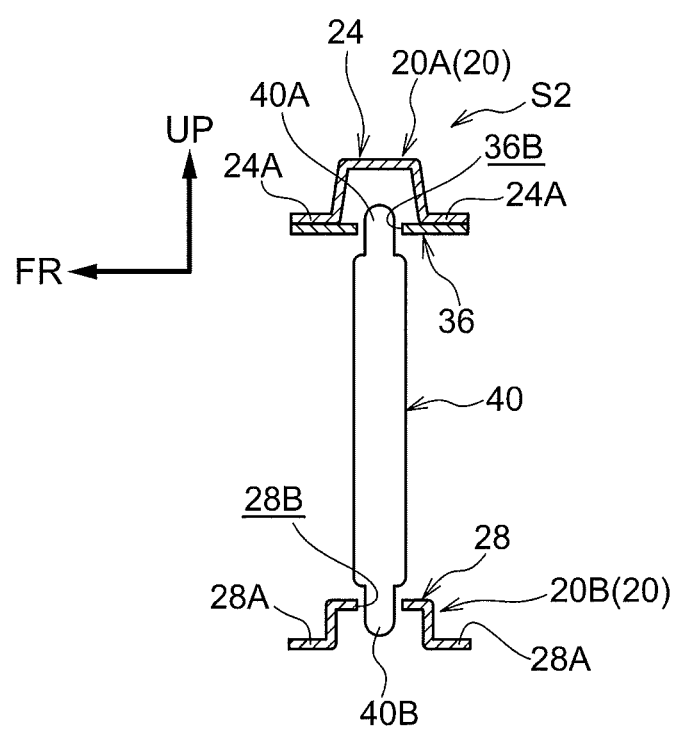
FIG. 5 is a side view cross-section illustrating a state in which a radiator body is supported by the radiator support structure illustrated in FIG. 1.

In the radiator support 20, the upper portion body 24, serving as a second attachment member, of the upper portion 20A, is disposed further to the vehicle upper side than the lower portion body 28, serving as a first attachment member, of the lower portion 20B. As illustrated in FIG. 5, the upper portion body 24 supports an upper portion of the radiator body 40, and the lower portion body 28 supports a lower portion of the radiator body 40.

More specifically, a plate shaped portion 36 is disposed at a vehicle up-down direction lower side of the upper portion body 24, and a pair of front and rear flanges 24A of the upper portion body 24 are respectively joined to a front end portion and a rear end portion of the plate shaped portion 36 by welding or the like. A vehicle front-rear direction intermediate portion of the plate shaped portion 36 is formed with at least two openings 36B on both vehicle width direction sides. The upper portion of the radiator body 40 is provided with projections 40A projecting out toward the vehicle upper side at positions facing the openings 36B, and the upper portion of the radiator body 40 is supported by the upper portion body 24 by engaging (inserting) the projections 40A in the openings 36B of the plate shaped portion 36.

Two openings 28B are formed on both vehicle width direction sides at a vehicle front-rear direction intermediate portion of the lower portion body 28 (see FIG. 2). The lower portion of the radiator body 40 is provided with projections 40B projecting out toward the vehicle lower side at positions facing the openings 28B, and the projections 40B are detachably inserted into the openings 28B of the lower portion body 28 such that the lower portion of the radiator body 40 is supported by the lower portion body 28. In the present exemplary embodiment, the external diameter of the projections 40B is set smaller than the internal diameter of the openings 28B. Accordingly, in a collision of the vehicle 10, when the upper portion of the radiator body 40 is pushed by the upper portion 20A and moves toward the vehicle rear side, the projections 40B easily come out of the openings 28B (see FIG. 6). Namely, the lower portion body 28 supports the radiator body 40 so as to be detachable with respect to the front side members 12.

Next, explanation follows regarding operation and advantageous effects of the present exemplary embodiment.

As illustrated in FIG. 2, etc., in the radiator support structure S2, the lower portion (first attachment member) 20B of the radiator support 20 is attached to the front side members 12. The upper portion (second attachment member) 20A of the radiator support 20 has a non-coupled structure (i.e., upper portion 20A can move) with respect to the lower portion 20B. The upper portion 20A is attached to the front bumper reinforcement 18 provided at the front end side of the crash boxes 16. In other words, the upper portion 20A is indirectly attached to the crash boxes 16, and is indirectly attached to the front side members 12 through the crash boxes 16, which are fixed to the front ends of the front end portions 12A of the front side members 12. Namely, the upper portion 20A is indirectly attached to the crash boxes 16, which are fixed to the front ends of the front end portions 12A of the front side members 12, through the front bumper reinforcement 18. The upper portion body 24 configuring the upper portion 20A is disposed on the vehicle upper side of the lower portion body 28 configuring the lower portion 20B.

As illustrated in FIG. 5, the upper portion of the radiator body 40 is supported by the upper portion body 24 configuring the upper portion 20A, and the lower portion of the radiator body 40 is supported by the lower portion body 28 configuring the lower portion 20B. More specifically, the projections 40A on the upper portion of the radiator body 40 engage with the openings 36B of the plate shaped portion 36 joined to the upper portion body 24, thereby supporting the upper portion of the radiator body 40 on the upper portion body 24. The projections 40B on the lower portion of the radiator body 40 are detachably inserted into the openings 28B of the lower portion body 28.

Figure 6:
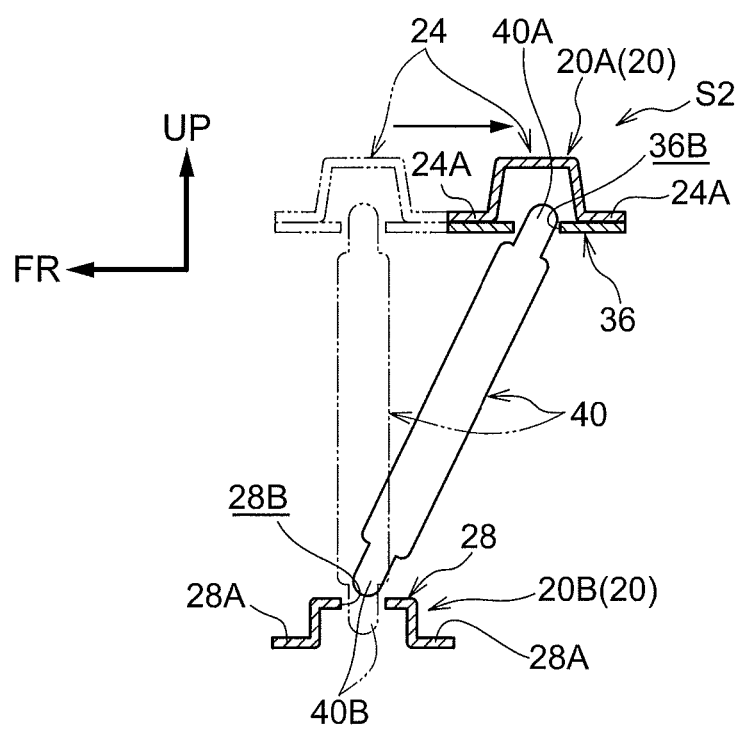
FIG. 6 is a side view cross-section illustrating a state in which an upper portion of the radiator body supported by the radiator support structure illustrated in FIG. 5 has moved toward the vehicle rear in a collision.

In this radiator support structure S2, in a collision of the vehicle 10, the crash boxes 16 are crushed in the vehicle front-rear direction when a collision load is input through the front bumper reinforcement 18. Accordingly, as illustrated in FIG. 6, the upper portion 20A of the radiator support 20 attached to the front bumper reinforcement 18 moves toward the vehicle rear side together with the front bumper reinforcement 18, thereby enabling the radiator body 40 supported by the upper portion 20A to move toward the vehicle rear side. When this occurs, the upper portion 20A and the lower portion 20B do not deform as a single unit, since the upper portion 20A has a non-coupled structure with respect to the lower portion 20B. When the radiator body 40 supported by the upper portion 20A moves toward the vehicle rear side, the projections 40B of the lower portion of the radiator body 40 detach from the openings 28B of the lower portion body 28 (see FIG. 6). Accordingly, the radiator support structure S2 enables deformation of the radiator body 40 in a collision to be better suppressed than in cases in which, for example, a radiator body is attached to a vehicle body (front side members or the like) through a radiator support (attachment member).

For example, in a structure in which a radiator support that supports a radiator is configured by an upper portion, a lower portion, and upright columns connecting the upper portion and the lower portion together, and the radiator support is attached to the vehicle body (front side members or the like), it would be difficult for the radiator body to move toward the vehicle rear side when the crash boxes 16 are crushed in the vehicle front-rear direction. Accordingly, in order to improve the damage performance of the radiator body (deformation suppressing performance of the radiator body) such that it does not break (or become seriously damaged), it would become necessary to provide a retracting mechanism to the upright columns of the radiator support to enable retracting, resulting in a more complex and heavier structure.

Moreover, as another structure, configurations in which a radiator support is assembled to front bumper reinforcement exhibit excellent damage performance. However, since there is no member connecting to front end portions of left and right front side members, it is difficult to secure positional precision of the front end portions of the front side members. There is a need to improve the positional precision of the front end portions of the left and right front side members in order to assemble lamps, a front bumper, and the like. Increased rigidity of the front side bumper, special precision management requirements, and an increase in costs are therefore possible.

However, in the radiator support structure S2 of the present exemplary embodiment, the upper portion 20A of the radiator support 20 is attached to the front bumper reinforcement 18. Accordingly in a collision, the upper portion 20A moves toward the vehicle rear side together with the front bumper reinforcement 18 by an amount commensurate with the crushing of the crash boxes 16, and the radiator body 40 supported by the upper portion 20A moves toward the vehicle rear side. When this occurs, the projections 40B of the lower portion of the radiator body 40 detach from the openings 28B of the lower portion body 28. This thereby enables deformation of the radiator body 40 in a collision to be suppressed, enabling improved damage performance. In the radiator support structure S2, the lower portion (first attachment member) 20B of the radiator support 20 is attached to (spans across) the front end portions 12A of the pair of left and right front side members 12, thereby enabling improved positional precision of the front end portions 12A of the left and right front side members 12. Moreover, since the upper portion 20A and the lower portion 20B of the radiator support 20 are not connected (have a non-coupled structure), the lengths of the wall bodies 22 of the upper portion 20A and the brackets 26 of the lower portion 20B can be made shorter than in the radiator support described above that is provided with upright columns connecting together the upper portion and the lower portion, thereby enabling a reduction in weight.

In the radiator support structure S2, the upper portion body 24 is disposed on the vehicle upper side of the lower portion body 28, and the upper portion of the radiator body 40 is supported by the upper portion body 24, and the lower portion of the radiator body 40 is supported by the lower portion body 28. Accordingly, in a collision of the vehicle 10, displacement of the upper portion of the radiator body 40 toward the vehicle rear side is permitted since the upper portion 20A moves toward the vehicle rear side together with the front bumper reinforcement 18 due to crushing of the crash boxes 16. Deformation of the radiator body 40 in a collision can accordingly be effectively suppressed, contributing to improved pedestrian protection performance.

In the radiator support structure S2, the lower portion body 28 configuring the lower portion 20B supports the radiator body 40 so as to be detachable with respect to the front side members 12. More specifically, the projections 40B of the lower portion of the radiator body 40 are detachably inserted into the openings 28B of the lower portion body 28. Accordingly, as illustrated in FIG. 6, in a collision of the vehicle 10, when the upper portion 20A moves toward the vehicle rear side together with the front bumper reinforcement 18, the upper portion body 24 pushes the upper portion of the radiator body 40 toward the vehicle rear side, and the projections 40B of the lower portion of the radiator body 40 detach from the openings 28B of the lower portion body 28 due to the principle of leverage. Deformation of the radiator body 40 can accordingly be effectively suppressed in a collision.

Second Exemplary Embodiment

Figure 7:
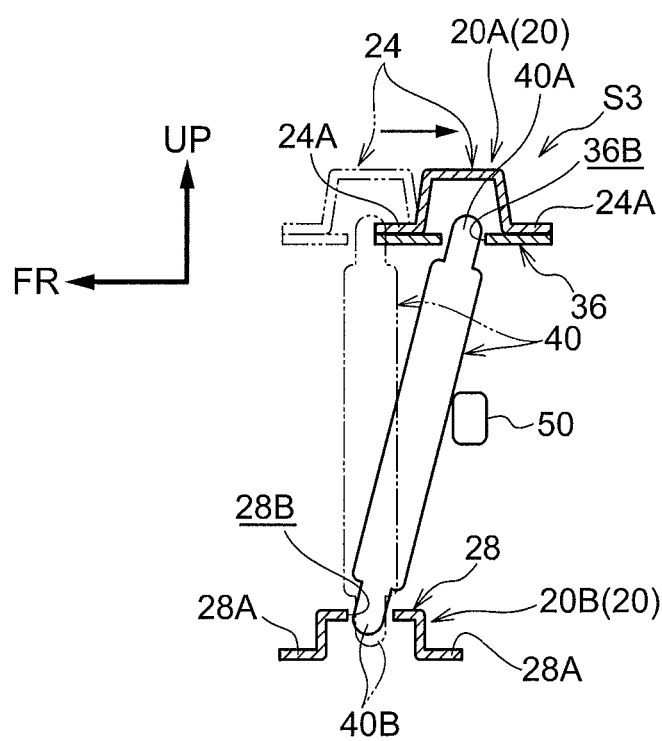
FIG. 7 is a side view cross-section illustrating a radiator support structure according to a second exemplary embodiment, illustrating a state in which an upper portion of a radiator body supported by the radiator support structure according to the second exemplary embodiment has moved toward the vehicle rear in a collision and contacted a support member.

Next, explanation follows regarding a second exemplary embodiment of a radiator support structure, with reference to FIG. 7. Note that configuration portions matching those of the first exemplary embodiment described above are allocated the same reference numerals and explanation thereof is omitted.

FIG. 7 is a schematic side view cross-section illustrating a radiator support structure S3. As illustrated in FIG. 7, in the radiator support structure S3, a support member 50 is disposed in the vicinity of the vehicle rear side of the radiator body 40. The support member 50 extends along the vehicle width direction, and both vehicle width direction sides of the support member 50 are attached to front side members 12 (see FIG. 1), not illustrated in the drawings. The support member 50 is disposed at the height of an up-down direction intermediate portion of the radiator body 40. In the present exemplary embodiment, the support member 50 is disposed at a height substantially midway in the up-down direction length of the radiator body 40; however, the position of the support member 50 may be modified. In the present exemplary embodiment, the support member 50 is formed with a substantially rectangular shape in side cross-section view; however, the shape of the support member 50 may be modified.

In this radiator support structure S3, the support member 50 is provided in the vicinity of the vehicle rear side of the radiator body 40, and extends along the vehicle width direction. Accordingly, in a collision, when the crash boxes 16 (see FIG. 1) are crushed and the upper portion 20A of the radiator support 20 moves toward the vehicle rear side together with the front bumper reinforcement 18, the upper portion of the radiator body 40 supported by the upper portion body 24 moves toward the vehicle rear side, and the vehicle up-down direction intermediate portion of the radiator body 40 contacts the support member 50. Due to the principle of leverage, the projections 40B on the lower portion of the radiator body 40 are encouraged to come out of the openings 28B of the lower portion body 28 earlier. The lower portion 20B of the radiator support 20 and the radiator body 40 can accordingly be separated from each other earlier.

In the present exemplary embodiment, the support member 50 is disposed along the vehicle width direction, and both vehicle width direction sides of the support member 50 are attached to the front side members 12 (see FIG. 1); however, the embodiment is not limited to such a configuration. For example, the support member 50 may be disposed over a portion of the vehicle width direction, rather than across substantially the entire vehicle width direction. Moreover, support members may be disposed only on the two sides in the vehicle width direction, or a support member may be disposed on only one side in the vehicle width direction. A support member may also be attached to the vehicle body other than at the front side members 12 (for example at suspension members).

Third Exemplary Embodiment

Figure 8:
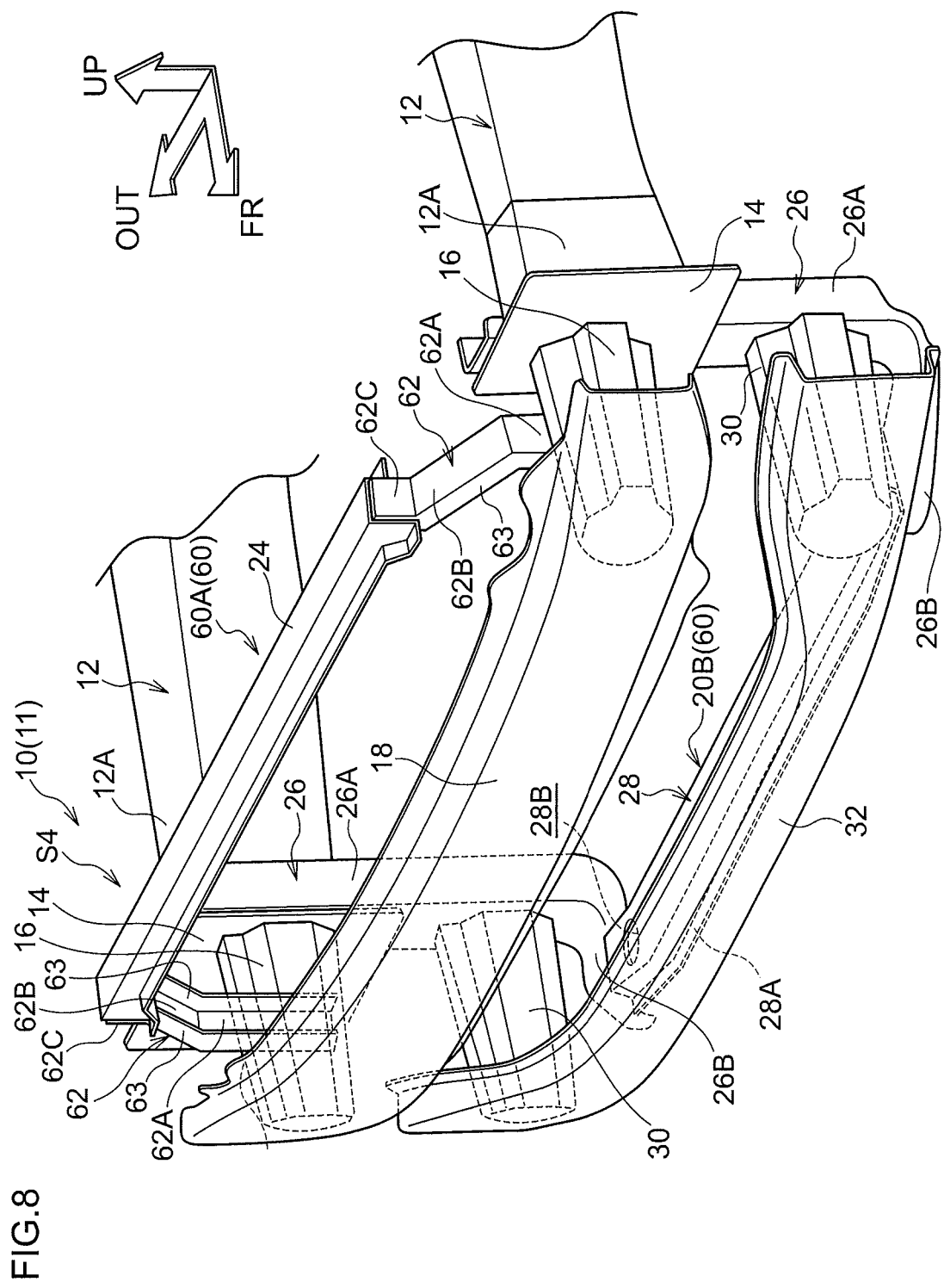
FIG. 8 is a perspective view illustrating a front section of a vehicle equipped with a radiator support structure according to a third exemplary embodiment.
Figure 9:
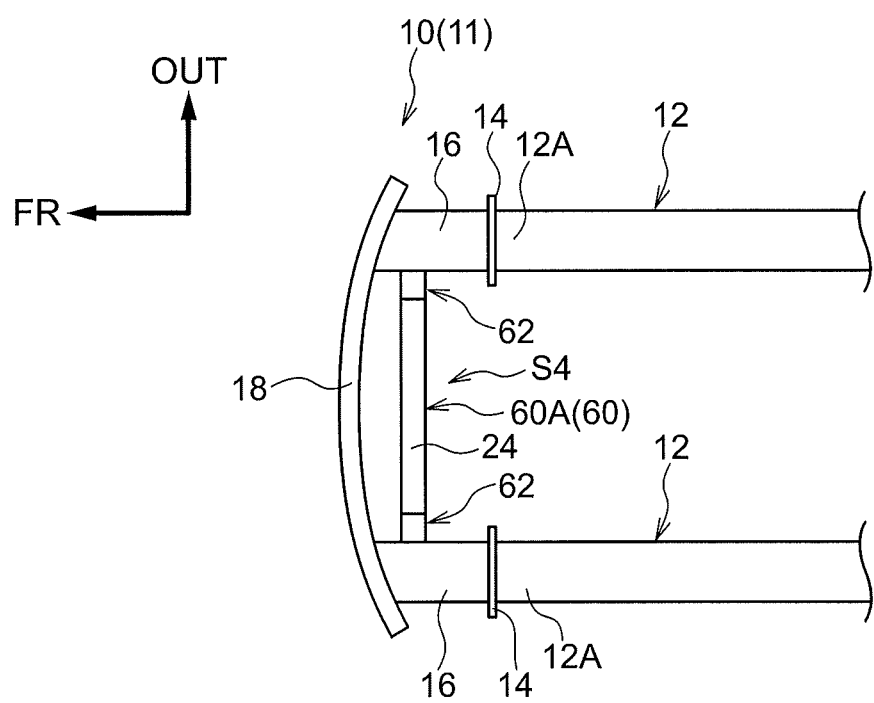
FIG. 9 is a plan view illustrating the radiator support structure illustrated in FIG. 8.

Next, explanation follows regarding a radiator support structure according to a third exemplary embodiment, with reference to FIG. 8 and FIG. 9. Note that configuration portions matching those of the first and second exemplary embodiments described above are allocated the same reference numerals, and explanation thereof is omitted.

FIG. 8 is a perspective view illustrating a front section of a vehicle equipped with a radiator support structure according to the present exemplary embodiment. FIG. 9 is a schematic plan view illustrating the radiator support structure illustrated in FIG. 8. As illustrated in FIG. 8 and FIG. 9, a radiator support structure S4 includes a radiator support 60. The radiator support 60 includes an upper portion 60A, serving as a second attachment member, attached to the crash boxes 16. The radiator support 60 includes a lower portion 20B, serving as a first attachment member, that has a non-coupled structure with respect to the upper portion 60A (is disposed separately to the upper portion 60A), and is attached to the front side members 12 (see FIG. 8). As illustrated in FIG. 8, the upper portion 60A and the lower portion 20B configuring the radiator support 60 are not connected together (are apart from and independent of each other). Namely, due to configuring the lower portion 20B with a non-coupled structure with respect to the upper portion 60A, the upper portion 60A and the lower portion 20B do not deform as a single unit.

The upper portion 60A includes a pair of left and right wall bodies 62 that are respectively fixed to inside face portions of the crash boxes 16, and an upper portion body 24 that is fixed to upper end portions of the wall bodies 62 and extends in the vehicle width direction between the wall bodies 62. The wall bodies 62 are formed in substantially crank shapes as viewed from the front of the vehicle. More specifically, each wall body 62 includes an attachment portion 62A that is fixed to the inside face portion of the crash box 16, an inclined portion 62B extending from an upper end of the attachment portion 62A toward an oblique upper side on the vehicle width direction inside, and an upper end portion 62C extending from an upper end of the inclined portion 62B toward the vehicle upper side. Edge portions of the attachment portion 62A, the inclined portion 62B, and the upper end portion 62C are provided with a bent portion 63 bending substantially toward the vehicle width direction inside.

In the present exemplary embodiment, the attachment portion 62A of the wall body 62 configuring the upper portion 60A is fixed to the crash box 16 by fasteners such as nuts and bolts, not illustrated in the drawings; however, it may be fixed to the crash box 16 by welding. Namely, the upper portion 60A of the radiator support 60 is directly attached to the crash boxes 16 and is attached to the front side members 12 through the crash boxes 16, which are fixed to the front end sides of the front side members 12. In other words, the upper portion 60A of the radiator support 60 is directly attached to the crash boxes 16, which are fixed to the front end sides of the front side members 12.

The upper portion body 24 serving as a second attachment member configuring the upper portion 60A is disposed at the vehicle upper side of the lower portion body 28 serving as a first attachment member configuring the lower portion 20B. The upper portion of the radiator body 40 (see FIG. 5) is supported by the upper portion body 24, and the lower portion of the radiator body 40 is supported by the lower portion body 28.

In the radiator support structure S4, in a collision of the vehicle 10, the crash boxes 16 are crushed in the vehicle front-rear direction when a collision load is input through the front bumper reinforcement 18. Accordingly, the upper portion 60A of the radiator support 60 attached to the crash boxes 16 moves toward the vehicle rear side together with the crash boxes 16, thereby enabling the radiator body 40 (see FIG. 5) supported by the upper portion 60A to move toward the vehicle rear side. When this occurs, the projections 40B of the lower portion of the radiator body 40 detach from the openings 28B of the lower portion body 28 (see FIG. 6). Accordingly, the radiator support structure S4 enables deformation of the radiator body 40 in a collision to be better suppressed than in cases in which a radiator body is attached to a vehicle body (front side members or the like) through a radiator support (attachment member).

Moreover, in a collision the upper portion 60A moves toward the vehicle rear side together with the crash boxes 16, thereby permitting displacement of the upper portion of the radiator body 40 toward the vehicle rear side, and thus more effectively suppressing deformation of the radiator body in a collision, and contributing to an improvement in pedestrian protection performance.

Fourth Exemplary Embodiment

Figure 10:
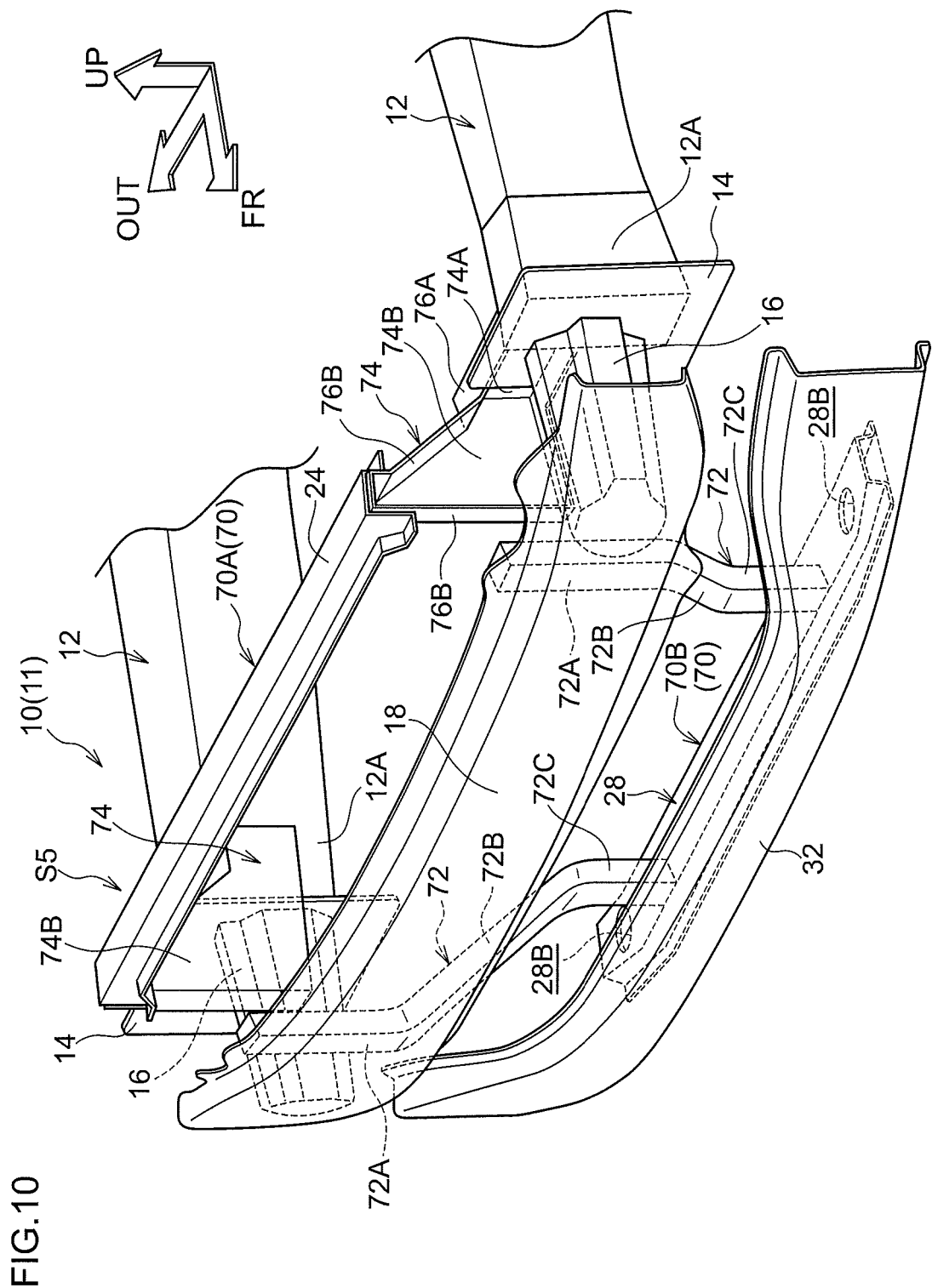
FIG. 10 is a perspective view illustrating a front section of a vehicle equipped with a radiator support structure according to a fourth exemplary embodiment.

Next, explanation follows regarding a fourth exemplary embodiment of a radiator support structure, with reference to FIG. 10. Note that configuration portions matching those of the first to third exemplary embodiments described above are allocated the same reference numerals, and explanation thereof is omitted.

FIG. 10 is a perspective view illustrating a front section of a vehicle equipped with a radiator support structure according to the present exemplary embodiment. As illustrated in FIG. 10, a radiator support structure S5 includes a radiator support 70. The radiator support 70 includes an upper portion 70A, serving as a first attachment member, that is attached to the front side members 12. The radiator support 70 further includes a lower portion 70B, serving as a second attachment member, that has a non-coupled structure with respect to the upper portion 70A (is disposed separately to the upper portion 70A and is movable independently of the upper portion 70A), and is attached to the front bumper reinforcement 18. In other words, the upper portion 70A and the lower portion 70B are not connected together (are apart from and independent of each other). Since the lower portion 70B has a non-coupled structure with respect to the upper portion 70A, the upper portion 70A and the lower portion 70B do not deform as a single unit.

The lower portion 70B of the radiator support 70 includes a pair of left and right wall bodies 72 that are fixed to both vehicle width direction sides of the front bumper reinforcement 18, and a lower portion body 28 that is fixed to lower end portions of the wall bodies 72 and extends in the vehicle width direction. The wall bodies 72 are formed substantially in crank shapes as viewed from the front of the vehicle. Upper end portions 72A of the wall bodies 72 are disposed substantially along the vehicle up-down direction, and are fixed to rear face portions of the front bumper reinforcement 18. A length direction intermediate portion 72B of each wall body 72 is bent toward an oblique vehicle lower side on the vehicle width direction inside from a lower end of the upper end portion 72A, and a lower end portion 72C is disposed running substantially along the vehicle up-down direction from a lower end of the intermediate portion 72B. The lower end portion 72C of the wall body 72 is fixed to an upper face of the lower portion body 28 by welding or the like. The pair of left and right wall bodies 72 are formed with left-right symmetry to each other, on both sides in the vehicle width direction.

In the present exemplary embodiment, the upper end portion 72A of the wall body 72 configuring the lower portion 70B is fixed to the front bumper reinforcement 18 by fasteners such as nuts and bolts, not illustrated in the drawings. Note that the upper end portion 72A of the wall body 72 may be fixed to the front bumper reinforcement 18 by welding.

As described above, the lower portion 70B of the radiator support 70 is attached to the front bumper reinforcement 18 extending substantially along the vehicle width direction at the vehicle front-rear direction front end sides of the crash boxes 16. In other words, the lower portion 70B of the radiator support 70 is indirectly attached to the crash boxes 16 and is indirectly attached to the front side members 12 through the crash boxes 16, which are fixed to the front sides of the front end portions 12A of the front side members 12. Namely, the lower portion 70B of the radiator support 70 is indirectly attached to the crash boxes 16, which are fixed to the front sides of the front end portions 12A of the front side members 12, through the front bumper reinforcement 18.

Note that the shape of the wall body 72 is not limited to that of the present exemplary embodiment, and may be modified.

The upper portion 70A of the radiator support 70 includes a pair of left and right brackets 74 attached to the front side members 12 on both vehicle width direction sides, and an upper portion body 24 that is fixed to upper end portions of the brackets 74 and extends in the vehicle width direction between the brackets 74. Each of the brackets 74 includes a wall body 74A extending from the front side member 12 toward the vehicle width direction inside, and an extension portion 74B extending from an inside end portion of the wall body 74A toward the vehicle front side and the vehicle upper side. The pair of left and right brackets 74 are formed with left-right symmetry to each other, on both sides in the vehicle width direction.

An edge portion of the wall body 74A of the bracket 74 is provided with a bent portion 76A bending toward the vehicle front side. Although omitted from the drawings, a vehicle width direction outside end portion of the wall body 74A is bent toward the vehicle front side, and is joined by welding to a side wall of the front end portion 12A of the front side member 12.

An edge portion of the extension portion 74B of the bracket 74 is provided with a bent portion 76B bending toward the vehicle width direction outside. The upper portion body 24 is disposed so as to cover upper end portions of the extension portion 74B and the bent portion 76B of the bracket 74, and the upper portion body 24 is joined to the bent portion 76B by welding.

Note that although not illustrated in the drawings, a sub-frame with a shape resembling an octothorpe is provided at a vehicle lower side of the front side members 12. The lower bumper reinforcement 32 is attached to the sub-frame through lower crash boxes.

The upper portion body 24, serving as a first attachment member, configuring the upper portion 70A is disposed on the vehicle upper side of the lower portion body 28, serving as a second attachment member, configuring the lower portion 70B. The upper portion of the radiator body 40 (see FIG. 5) is supported by the upper portion body 24, and the lower portion of the radiator body 40 is supported by the lower portion body 28.

The upper portion body 24 of the upper portion 70A provided to the radiator support 70 detachably supports the projections of the upper portion of the radiator body 40 with respect to the vehicle body (the front side members 12).

In this radiator support structure S5, in a collision of the vehicle 10, the crash boxes 16 are crushed in the vehicle front-rear direction when a collision load is input through the front bumper reinforcement 18. Accordingly, the lower portion 70B of the radiator support 70 attached to the front bumper reinforcement 18 moves toward the vehicle rear side together with the front bumper reinforcement 18, thereby enabling the radiator body 40 (see FIG. 5) supported by the lower portion 70B to move toward the vehicle rear side. When the radiator body 40 supported by the lower portion 70B moves toward the vehicle rear side, the projections of the upper portion of the radiator body 40 detach from the upper portion body 24 of the upper portion 70A of the radiator support 70. Namely, in a collision the lower portion 70B moves toward the vehicle rear side together with the front bumper reinforcement 18, thereby permitting displacement of the lower portion of the radiator body 40 toward the vehicle rear side, and thus enabling deformation of the radiator body 40 in a collision to be suppressed. Accordingly, the radiator support structure S5 enables deformation of the radiator body 40 in a collision to be better suppressed than in cases in which a radiator body is attached to a vehicle body (such as front side members) through a radiator support (attachment member).

Fifth Exemplary Embodiment

Figure 11:
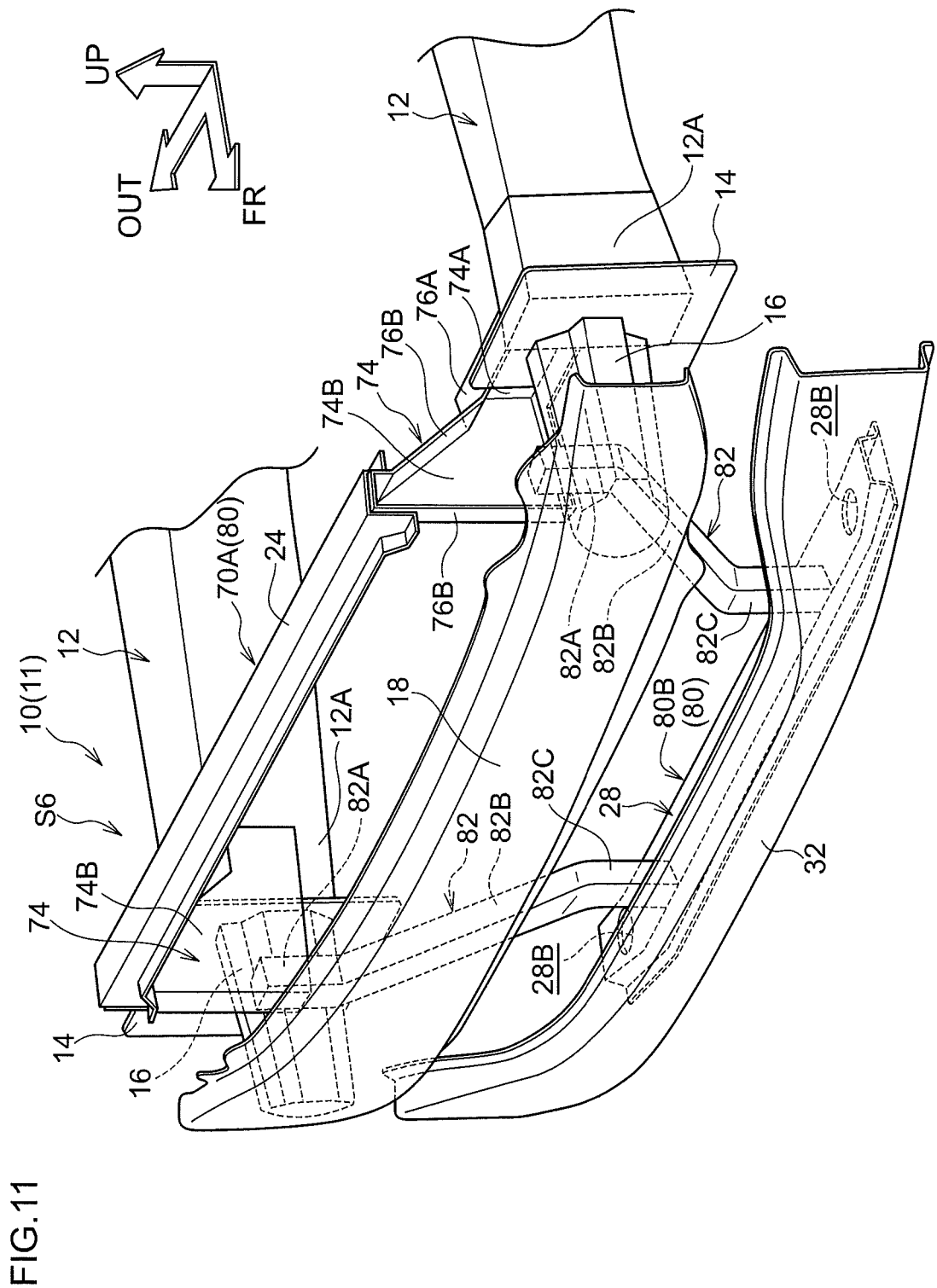
FIG. 11 is a perspective view illustrating a front section of a vehicle equipped with a radiator support structure according to a fifth exemplary embodiment.

Next, explanation follows regarding a fifth exemplary embodiment of a radiator support structure, with reference to FIG. 11. Note that configuration portions matching those of the first to fourth exemplary embodiments are allocated the same reference numerals, and explanation thereof is omitted.

FIG. 11 is a perspective view illustrating a front section of a vehicle equipped with a radiator support structure according to the present exemplary embodiment. As illustrated in FIG. 11, a radiator support structure S6 includes a radiator support 80. The radiator support 80 includes an upper portion 70A, serving as a first attachment member, attached to the front side members 12. The radiator support 80 further includes a lower portion 80B, serving as a second attachment member, that has a non-coupled structure with respect to the upper portion 70A (is disposed separately to the upper portion 70A and is movable independently of the upper portion 70A), and that is attached to the crash boxes 16. In other words, the upper portion 70A and the lower portion 80B are not connected to each other (are apart from and independent of each other). Since the lower portion 80B has a non-coupled structure with respect to the upper portion 70A, the upper portion 70A and the lower portion 80B do not deform as a single unit.

The lower portion 80B of the radiator support 80 includes a pair of left and right wall bodies 82 that are fixed to inside face portions of the crash boxes 16, and a lower portion body 28 that is fixed to lower end portions of the wall bodies 82 and extends in the vehicle width direction between the wall bodies 82. The wall bodies 82 are formed substantially in crank shapes as viewed from the front of the vehicle. An upper end portion 82A of each of the wall bodies 82 is disposed substantially along the vehicle up-down direction, and is fixed to the inside face portion of the crash box 16. A length direction intermediate portion 82B of the wall body 82 is bent from a lower end of the upper end portion 82A toward a vehicle oblique lower side on the vehicle width direction inside, and a lower end portion 82C is disposed substantially along the vehicle up-down direction from a lower end of the intermediate portion 82B. In comparison to the wall bodies 72 illustrated in FIG. 10, in the wall bodies 82 of the present exemplary embodiment, the intermediate portions 82B have a gentler incline with respect to the horizontal direction, and the upper end portions 82A are disposed further to the vehicle width direction outside. The lower end portions 82C of the wall bodies 82 are fixed to the upper face of the lower portion body 28 by welding or the like. The pair of left and right wall bodies 82 are formed with left-right symmetry to each other, on both sides in the vehicle width direction.

In the present exemplary embodiment, the upper end portion 82A of the wall body 82 configuring the lower portion 80B is fixed to the crash box 16 by fasteners such as nuts and bolts, not illustrated in the drawings. Note that the upper end portion 82A of the wall body 82 may be fixed to the crash box 16 by welding.

As described above, the lower portion 80B of the radiator support 80 is directly attached to the crash boxes 16 and is indirectly attached to the front side members 12 through the crash boxes 16, which are fixed to the front sides of the front end portions 12A of the front side members 12. Namely, the lower portion 80B of the radiator support 80 is directly attached to the crash boxes 16, which are fixed to the front sides of the front end portions 12A of the front side members 12.

The upper portion body 24 of the upper portion 70A provided to the radiator support 80 detachably supports the projections of the upper portion of the radiator body 40 with respect to the vehicle body (front side members 12).

In this radiator support structure S6, in a collision of the vehicle 10, the crash boxes 16 are crushed in the vehicle front-rear direction when a collision load is input through the front bumper reinforcement 18. Accordingly, the lower portion 80B of the radiator support 80 attached to the crash boxes 16 moves toward the vehicle rear side together with the crash boxes 16, thereby enabling the radiator body 40 (see FIG. 5) supported by the lower portion 80B to move toward the vehicle rear side. When the radiator body 40 supported by the lower portion 80B moves toward the vehicle rear side, the projections of the upper portion of the radiator body 40 detach from the upper portion body 24 of the upper portion 70A of the radiator support 80. Namely, in a collision the lower portion 80B moves toward the vehicle rear side together with the crash boxes 16, thereby permitting displacement of the lower portion of the radiator body 40 toward the vehicle rear side, and thus enabling deformation of the radiator body 40 in a collision to be suppressed. Accordingly, the radiator support structure S6 enables deformation of the radiator body 40 in a collision to be better suppressed than in cases in which the radiator body is attached to a vehicle body (such as front side members) through a radiator support (attachment member).

Note that in the first to the fifth exemplary embodiments, the lower portion of the radiator support supports the lower portion of the radiator body, and the upper portion of the radiator support supports the upper portion of the radiator body. However, the embodiments are not limited thereto. For example, at least one out of the first attachment member and the second attachment member configuring the radiator support may be configured so as to support the left and right of the radiator body.

In the first to the fourth exemplary embodiments, the first attachment member is configured to detachably support the radiator body 40 with respect to the vehicle body (front side members 12); however, the embodiments are not limited thereto. For example, configuration may be made such that the second attachment member detachably supports the radiator body 40 with respect to the vehicle body (front side members 12). Moreover, configuration may be made such that either the first attachment member or the second attachment member deforms in a collision.

In the first to the third exemplary embodiments, the lower portion of the radiator support is attached to the front side members 12; however, the embodiments are not limited thereto. For example, the lower portion of the radiator support may be attached to the vehicle body at suspension members or the like disposed at the vehicle lower side of the front side members 12.

In the fourth and the fifth exemplary embodiments, the upper portion of the radiator support is attached to the front side members 12; however, the embodiments are not limited thereto. For example, the upper portion of the radiator support may be attached to the vehicle body at suspension members or the like, disposed at the vehicle lower side of the front side members 12.

In the second exemplary embodiment, the support member 50 is disposed in the vicinity of the vehicle rear side of the radiator body 40; however, configurations including the support member 50 are not limited to such an exemplary embodiment. For example, in the third to the fifth exemplary embodiments, a support member 50 may be similarly disposed in the vicinity of the vehicle rear side of the radiator body 40. This thereby enables earlier detachment of the radiator body 40 from the first attachment member.

The entire contents of Japanese Patent Application No. 2015-029739, filed on Feb. 18, 2015, are incorporated by reference in the present specification.

All cited documents, patent applications and technical standards mentioned in the present specification are incorporated by reference in the present specification to the same extent as if the individual cited document, patent application, or technical standard was specifically and individually indicated to be incorporated by reference.

What is claimed is:

1. A radiator support structure comprising:
a first attachment member that is fixed to a vehicle body without any shock absorbing member between the vehicle body and the first attachment member, and that supports a radiator body; and
a second attachment member that (i) is separate from and unattached to the first attachment member, (ii) is attached to a front side member of the vehicle body through a shock absorbing member that is fixed to a vehicle front-rear direction front end of the front side member, and (iii) supports the radiator body, wherein
at least one of the first attachment member and the second attachment member includes a slidable connector that slidably connects to the radiator body and that slidably detaches from the radiator body when a collision force in the vehicle front-rear direction is applied to the second attachment member.

2. The radiator support structure of claim 1, wherein:
the second attachment member is disposed at a vehicle upper side of the first attachment member; and
the second attachment member is configured to support an upper portion of the radiator body, and the first attachment member is configured to support a lower portion of the radiator body.

3. The radiator support structure of claim 1, wherein:
the second attachment member is disposed at a vehicle lower side of the first attachment member; and
the second attachment member is configured to support a lower portion of the radiator body, and the first attachment member is configured to support an upper portion of the radiator body.

4. The radiator support structure of claim 1, wherein the first attachment member includes the slidable connector that slidably and detachably supports the radiator body with respect to the vehicle body.

5. The radiator support structure of claim 4, further comprising a support member extending along a vehicle width direction, the support member being disposed in a vicinity of a vehicle rear side of the radiator body and arranged to cause the radiator body to detach from the slidable connector as the radiator body contacts the support member due to the second attachment member moving toward a vehicle rear direction from the collision force.

6. The radiator support structure of claim 1, wherein the second attachment member is attached to a bumper reinforcement that is fixed to a vehicle front-rear direction front end of the shock absorbing member, and that extends in a vehicle width direction.

7. The radiator support structure of claim 1, wherein the second attachment member is directly attached to the shock absorbing member.

8. The radiator support structure of claim 1, wherein the second attachment member is indirectly attached to the shock absorbing member through another member.

9. A radiator support structure comprising:
a first attachment member that is configured to be rigidly fixed to a vehicle body without any shock absorbing member between the vehicle body and the first attachment member, and that is configured to support a radiator body at a first location of the radiator body;
a shock absorbing member that is fixed to the vehicle body and that compresses in the vehicle front-rear direction when a collision force in the vehicle front-rear direction is applied to the shock absorbing member; and
a second attachment member that is (i) attached to the shock absorbing member, and (ii) configured to support the radiator body at a second location of the radiator body, the second location spaced from the first location, wherein at least one of the first attachment member and the second attachment member includes a slidable connector that slidably connects to the radiator body and that slidably detaches from the radiator body when the shock absorbing member compresses in the vehicle front-rear direction.

10. The radiator support structure of claim 9, wherein:
the second attachment member is disposed at a vehicle upper side of the first attachment member; and
the second attachment member is configured to support an upper portion of the radiator body, and the first attachment member is configured to support a lower portion of the radiator body.

11. The radiator support structure of claim 9, wherein:
the second attachment member is disposed at a vehicle lower side of the first attachment member; and
the second attachment member is configured to support a lower portion of the radiator body, and the first attachment member is configured to support an upper portion of the radiator body.

12. The radiator support structure of claim 9, wherein the first attachment member includes the slidable connector that slidably and detachably supports the radiator body with respect to the vehicle body.

13. The radiator support structure of claim 12, further comprising a support member extending along a vehicle width direction, the support member being disposed in a vicinity of a vehicle rear side of the radiator body and arranged to cause the radiator body to detach from the slidable connector as the radiator body contacts the support member due to the second attachment member moving toward a vehicle rear direction from the collision force.

14. The radiator support structure of claim 9, wherein the second attachment member is attached to a bumper reinforcement that is fixed to a vehicle front-rear direction front end of the shock absorbing member, and that extends in a vehicle width direction.

15. The radiator support structure of claim 9, wherein the second attachment member is directly attached to the shock absorbing member.

16. The radiator support structure of claim 9, wherein the second attachment member is indirectly attached to the shock absorbing member through another member.

* * * * *